(12) United States Patent
Lawrence et al.

(10) Patent No.: US 10,851,838 B2
(45) Date of Patent: Dec. 1, 2020

(54) LINER-AS-SEAL BEARINGS

(71) Applicant: Triton Systems, Inc., Chelmsford, MA (US)

(72) Inventors: Tyson Lawrence, Cambridge, MA (US); Bryan Andrew Smith, Boston, MA (US)

(73) Assignee: TRITON SYSTEMS, INC., Chelmsford, MA (US)

( * ) Notice: Subject to any disclaimer, the term of this patent is extended or adjusted under 35 U.S.C. 154(b) by 0 days.

(21) Appl. No.: 14/607,850

(22) Filed: Jan. 28, 2015

(65) Prior Publication Data

US 2015/0211579 A1 Jul. 30, 2015

Related U.S. Application Data

(60) Provisional application No. 61/932,355, filed on Jan. 28, 2014.

(51) Int. Cl.
| | |
|---|---|
| *F16C 23/04* | (2006.01) |
| *F16C 27/02* | (2006.01) |
| *F16C 33/20* | (2006.01) |
| *F16C 27/06* | (2006.01) |
| *F16C 33/74* | (2006.01) |
| *F16C 11/06* | (2006.01) |

(52) U.S. Cl.
CPC ............ *F16C 33/74* (2013.01); *F16C 11/068* (2013.01); *F16C 23/045* (2013.01); *F16C 27/063* (2013.01); *F16C 33/203* (2013.01); *F16C 27/02* (2013.01); *F16C 2226/40* (2013.01)

(58) Field of Classification Search
CPC .... F16C 11/068; F16C 11/0683; F16C 33/20; F16C 33/74; F16C 23/043; F16C 27/02; F16C 27/063; F16C 43/02; Y10T 403/2631; Y10T 29/49655; Y10T 29/49853
USPC ......... 384/125, 192, 203, 206, 215, 276, 95, 384/103, 129, 152; 403/122, 135, 120
See application file for complete search history.

(56) References Cited

U.S. PATENT DOCUMENTS

| | | | | |
|---|---|---|---|---|
| 2,488,775 | A * | 11/1949 | Heim | F16C 11/0614 29/898.043 |
| 2,804,679 | A * | 9/1957 | Tracy | B21K 1/04 29/520 |
| 3,322,474 | A * | 5/1967 | Destival | 384/215 |
| 3,452,415 | A * | 7/1969 | Beazley et al. | 29/898.047 |
| 3,594,049 | A * | 7/1971 | Turner | 384/206 |
| 3,647,249 | A * | 3/1972 | Baba et al. | 3/140 |
| 3,969,232 | A * | 7/1976 | Turner | F16C 11/0614 384/202 |
| 4,084,863 | A * | 4/1978 | Capelli | 384/300 |
| 4,111,499 | A * | 9/1978 | McCloskey | 384/192 |
| 4,243,274 | A * | 1/1981 | Greene | 384/111 |
| 4,482,792 | A * | 11/1984 | Geremia | H01H 23/06 200/284 |
| 4,906,027 | A * | 3/1990 | De Gruijter | F16L 25/03 174/85 |

(Continued)

FOREIGN PATENT DOCUMENTS

| | | | | |
|---|---|---|---|---|
| EP | 2777870 | A1 * | 9/2014 | ........... B23Q 1/0018 |
| GB | 2400147 | A * | 10/2004 | ........... F16C 23/045 |

*Primary Examiner* — Marcus Charles
(74) *Attorney, Agent, or Firm* — Troutman Pepper Hamilton Sanders LLP

(57) ABSTRACT

Disclosed are bearing assemblies including a compliant layer within a mounting socket for reducing wear of the bearing.

17 Claims, 3 Drawing Sheets

(56) References Cited

U.S. PATENT DOCUMENTS

| | | | |
|---|---|---|---|
| 5,058,867 A * | 10/1991 | Hadano et al. | 267/141.3 |
| 5,364,191 A * | 11/1994 | Gruber | 384/203 |
| 5,431,540 A * | 7/1995 | Doolin et al. | 416/168 R |
| 5,507,534 A * | 4/1996 | Reifenberger | F16L 27/04 285/122.1 |
| 5,902,050 A * | 5/1999 | Balczun et al. | 384/206 |
| 6,051,010 A * | 4/2000 | DiMatteo et al. | 606/169 |
| 6,352,228 B1 * | 3/2002 | Buerklin | F16C 11/106 248/181.1 |
| 6,824,323 B2 * | 11/2004 | Garnier et al. | 403/135 |
| 7,188,869 B2 * | 3/2007 | Garraffa | B63C 11/2227 128/202.27 |
| 7,433,188 B2 * | 10/2008 | Miller | 361/690 |
| 7,452,155 B2 * | 11/2008 | Brunneke | 403/135 |
| 8,511,203 B2 * | 8/2013 | Ball et al. | 74/567 |
| 2001/0011054 A1 * | 8/2001 | O'Shea | A61B 5/20 482/82 |
| 2009/0279820 A1 * | 11/2009 | Nishide | B21K 1/05 384/206 |
| 2009/0304315 A1 * | 12/2009 | Johnson | B23P 9/025 384/295 |
| 2010/0040407 A1 * | 2/2010 | Rechtien et al. | 403/122 |
| 2011/0027559 A1 * | 2/2011 | Kirby et al. | 428/215 |
| 2011/0245042 A1 * | 10/2011 | Teal et al. | 482/57 |
| 2015/0001842 A1 * | 1/2015 | Jones | F16L 27/047 285/261 |
| 2015/0093057 A1 * | 4/2015 | Hunter et al. | 384/125 |
| 2016/0061368 A1 * | 3/2016 | Carlberg | F16L 27/023 285/146.1 |

* cited by examiner

LINER-AS-SEAL BEARINGS

CROSS-REFERENCE TO RELATED APPLICATIONS

This application claims priority to U.S. Provisional No. 61/932,355 entitled "Liner-As-Seal Bearings" filed Jan. 28, 2014, the entire contents of which is hereby incorporated by reference.

GOVERNMENT INTERESTS

This invention was made with Government support under Contract No. N68335-13-C-0256 awarded by the U.S. Navy, Naval Air Systems Command. The Government has certain rights in this invention.

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Plain spherical bearings are used in a wide variety of mechanical applications. When operating in environments rich with particulate, bearings often become contaminated and experience accelerated wear. This leads to increased maintenance costs as the bearings are replaced more frequently than in clean environments, and replacement can be a labor intensive and costly process. The more that a bearing wears, the more susceptible to contamination it becomes, leading to exponential wear. This design prevents the ingress of harmful contaminants effectively extending bearing life in contaminant rich environments.

This new design represents a drop-in replacement for existing bearings, which is capable of operating at high speeds and full range of motion. Existing solutions involve either wrapping the bearing in an elastomer boot or cup, or using a squeegee type seal affixed to the rim of the bearing. Existing assemblies may not have space for an add-on type of piece, requiring redesign of an entire assembly to accommodate the integration of a new component. The added component also reduces the full range of motion for the bearing. Additionally, they impede inspection of the part, making it more difficult for maintenance personnel to identify when bearings need to be changed. The boot and cup type have been observed to trap contamination once it penetrates the shield. The squeegee style lip seals tend to be limited to low speed applications. The seal material usually has a higher coefficient of friction than the liner material, resulting in the seal overheating and essentially burning up at higher speeds. By using the existing liner as the contact surface, the design presented here will not have this problem.

SUMMARY OF THE INVENTION

Various embodiments are directed to bearing assemblies including a housing, having a body axially spaced sides, an axially extending bore forming a mounting surface, extending between the axial sides, a bearing housed within the axially extending bore, a liner disposed on at least one circumferential surface of the mounting surface and positioned to contact the bearing, and a compliant layer disposed between the liner and the mounting surface. In such embodiments, the liner may be a low friction or self-lubricating material and the bearing may be a spherical bearing, ball bearing, or shaft.

In some embodiments, the compliant layer may be thermoplastic or elastomeric polymers, composite materials, metals, woven and non-woven materials, fabrics, plastic wool, steel wools, steel spring, and the like, fiber reinforced materials, carbon fiber reinforced polymers or metal composites, and combinations thereof, and in various embodiments, the compliant layer may be at least partially compressed. The properties of the compliant layer may vary, and the compliant layer may have a shear strength of about 500 psi to about 30,000 psi, a compressive strength measured as a uniaxial compressive force of about 500 psi to about 35,000 psi, a response time necessary for the compliant layer when compressed to fully deform in about 0.001 seconds to 1 seconds, or various combinations thereof.

In certain embodiments, the compliant layer may include a material such as, but not limited to, polyisoprene, cis-1, 4-polyisoprene natural rubber (NR), trans-1,4-polyisoprene gutta-percha, synthetic polyisoprene (IR), polybutadiene (BR), chloroprene rubber (CR), polychloroprene, Neoprene, Baypren, butyl rubber, copolymers of isobutylene and isoprene (IIR), halogenated butyl rubbers, chloro butyl rubber (CIIR), bromo butyl rubber (BIIR), styrene-butadiene rubber (SBR), nitrile rubber, copolymer of butadiene and acrylonitrile (NBR), hydrogenated nitrile rubbers (HNBR), saturated rubbers, ethylene propylene rubber (EPM), ethylene propylene diene rubber (EPDM), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA), and co-polymers and combinations thereof. IN some embodiments, the compliant layer may include two or more different materials bonded together. The compliant layer may be bonded to socket of the housing the bearing, such as spherical, ball, or shaft, or both the housing and the bearing. In some embodiments, the compliant layer may be attached to the liner by adhesives or chemical bonding, and in certain embodiments, the compliant layer and the liner may be the same material. In further embodiments, the bearing assembly may further include bordering edges along an outer edge of the axially extending bore.

Additional embodiments are directed to bearing assemblies including a housing, having a body axially spaced sides, an axially extending bore forming a mounting surface, extending between the axially spaced sides, a bearing housed within the axially extending bore, a compliant layer comprising one or more o-rings contacting the mounting surface, and a liner disposed on the mounting surface and positioned to contact the bearing. In some embodiments, the bearing assemblies may further include grooves in the axially extending bore sized to retain at least one of the one or more o-rings. In certain embodiments, at least one of the one or more o-rings may be positioned near an outer edge of the axially extending bore. In particular embodiments, the liner may be attached to the mounting surface on either side of the o-ring. In various embodiments, the bearing may contact the liner at a bulge in the liner created by the o-ring. In some embodiments, the bearing assembly may further include a relief groove or hole in the housing positioned to allow air flow between the liner and the bearing. In particular embodiments, the bearing assembly may further include bordering edges along an outer edge of the axially extending bore.

DESCRIPTION OF DRAWINGS

For a better understanding of the disclosure and to show how the same may be carried into effect, reference will now be made to the accompanying drawings. It is stressed that the particulars shown are by way of example only and for purposes of illustrative discussion of the preferred embodiments of the present disclosure only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
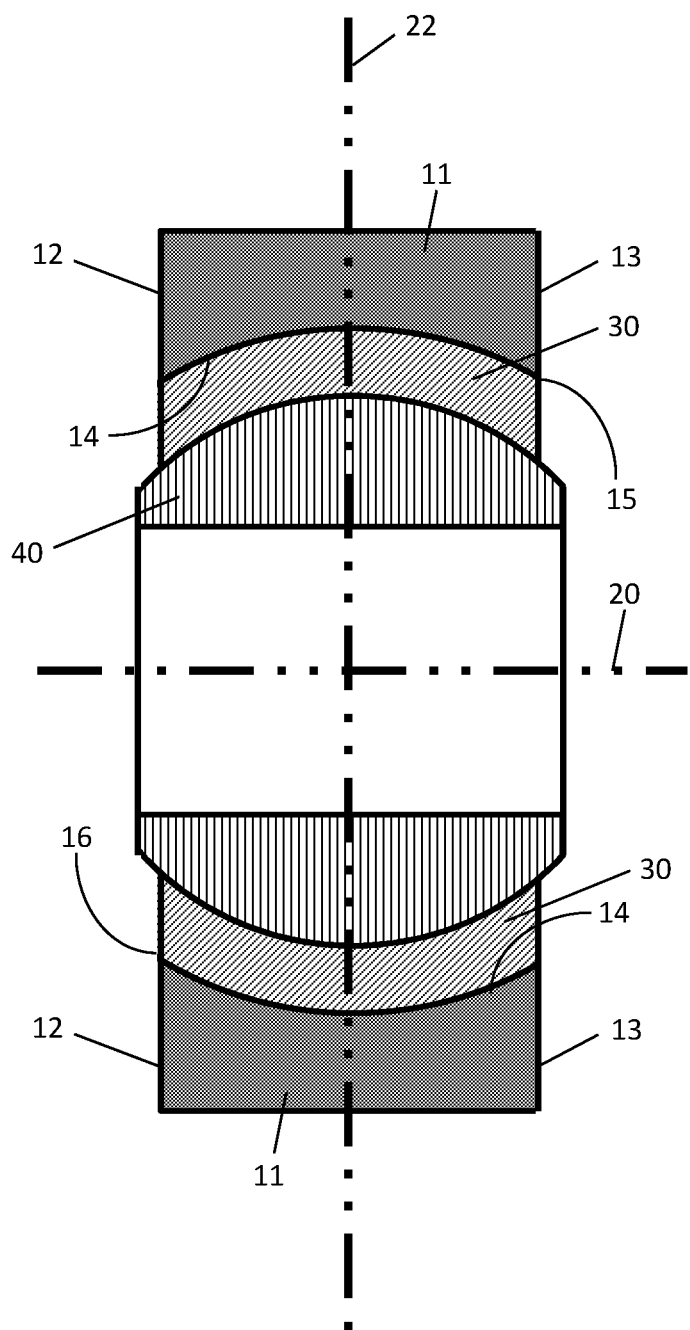
FIG. 1 is a drawing illustrating an example of a bearing assembly.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

"Optional" or "optionally" means that the subsequently described event or circumstance may or may not occur, and that the description includes instances where the event occurs and instances where it does not.

"Substantially no" means that the subsequently described event may occur at most about less than 10% of the time or the subsequently described component may be at most about less than 10% of the total composition, in some embodiments, and in others, at most about less than 5%, and in still others at most about less than 1%.

Embodiments of the invention are directed to bearing assemblies including a one or more material layers within an outer race that acts as seal reducing contamination of the bearing by, for example, particulates and fluids between the liner and bearing surface that can accelerate wear. In particular embodiments, the material layer may include a liner that provides a low-friction surface that contacts the ball or shaft of the bearing and a compliant material between the liner and the contacting surface of the ball or shaft of the bearing that allows the liner to maintain contact between the liner and the ball or shaft surface. In use, the compliant layer is compressed when the bearing contacts the liner. The compliant layer may maintain low resistance throughout the compression range allowing the compliant layer to force the liner to maintain contact with the bearing surface as the liner wears, extending the life of the bearing. The compliant layer and the low friction liner may also be combined to provide a single low friction compliant material that both maintains contact with the mating surface and serves to maintain low friction.

The bearing assemblies described above including a compliant layer can be incorporated into any type of bearing including, for example, ball bearings, roller bearings, cylindrical bushings, "plain" bearings, and the like or any surface that experiences relative motion, for example, flat plate surfaces. In addition, the compliant layer and liner can be attached to the housing or race as described above, or the compliant layer and liner can be attached to the ball or shaft of the bearing such that the liner contacts the housing or race when the ball or shaft is received by the housing. Further, the compliant layer and liner may extend over the entire mating surface or a reduced area of any pattern. For example, the compliant layer may be a ring under each side of a cylindrical bushing such that the liner is forced outwards at or near each exposed end of the cylindrical bushing. Alternatively, the liner may not cover the entire mating surface. This may have various benefits including allowing the compliant material to make direct contact with the mating surface for increased seal integrity or to create a groove that allows air to flow internally behind the seal, for example, around the circumference of a bushing to prevent a local vacuum from forming that may pull contamination into the bearing assembly.

FIG. 1 illustrates a bearing assembly 1 of various embodiments may include an outer housing or race 10, having a body 11 with a longitudinal axis 20 and axially spaced sides 12 and 13. Extending between the axial sides 12 and 13 is an axially extending bore forming a mounting surface, or socket, 14, which in certain embodiments may be concave. In some embodiments, the mounting surface 14 may have a maximum diameter at a traverse axis 22 of the body 11, and the diameter of the mounting socket 14 may diminish in either direction away from the traverse axis to opposing circumferential openings 15 and 16 having a minimum diameter on each axial side 12 and 13 of the body. In various embodiments, at least one surface of the mounting socket 14 may be coated with a low-friction bearing surface, or liner, 30 composed of a low friction or self-lubricating material. A bearing such as spherical bearing, ball, 40 or shaft may be housed within the mounting socket 14. The bearing 40 may contact the liner 30 on at least one circumferential surface and may be freely rotatable in the mounting socket 14.

Figure 2:
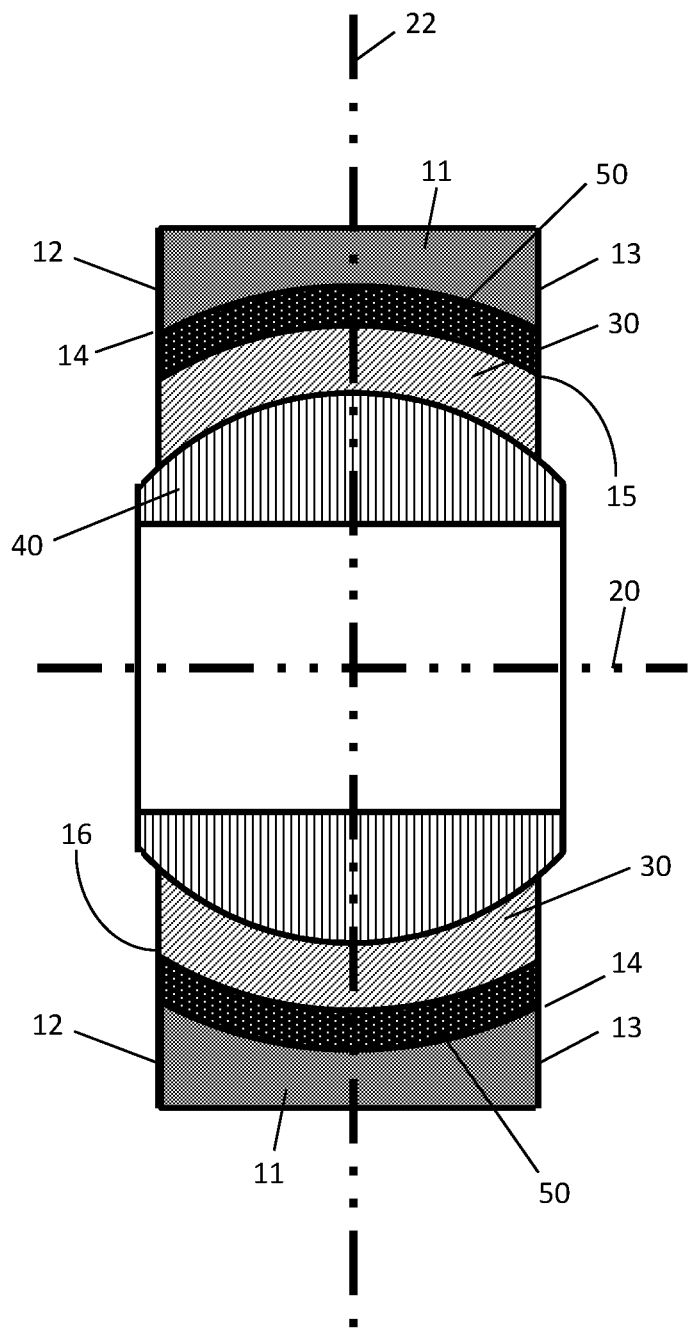
FIG. 2 is a drawing illustrating an example of a bearing assembly that includes a compliant layer.

In particular embodiments as illustrated in FIG. 2, bearing assemblies 2, such as those described in relation to FIG. 1, may further include a compliant layer 50 disposed between the liner 30 and the mounting socket 14 of the housing or race 10. The compliant layer 50 may be composed of any material known in the art that is capable of forcing the liner 30 away from the surface of the mounting socket 14 and toward the bearing 40. In some embodiments, the compliant layer 50 may be pre-loaded in compression. As such, the circumference of the area within the race 10 created by the liner 30 and compliant layer 50 may be smaller than the circumference of the bearing 40, and insertion of the bearing 40 into the race 10 may cause the compliant layer to compress. The force against the liner 30 created by the compliant layer 50 may allow the liner to maintain contact with the bearing even as the liner begins to wear away thereby reducing the likelihood of a gap or other space forming between the mounting surface 14 and the bearing 40 or the liner 30 and the bearing allowing particulates to contact the bearing surface causing wear.

The compliant layer 50 may be composed of one or more material layers, and each material layer of the compliant layer 50 may be composed of the same or different materials. For example, in some embodiments, each material layer may be composed of sheet or film of the same materials that have been bonded together through a melting or welding process or using a bonding material or adhesive layer between each material layer. In other embodiments, the compliant layer may include two or more material layers composed of a first material and one or more additional layers composed of different materials which may or may not have a similar physical profile to the first material layer. In still other embodiments, each material layer may be composed of a different material, and each material used may have a similar or different physical profiles. For example, in some embodiments, a compliant layer 50 may include a first layer contacting a surface of the mounting socket 14 composed of a softer more elastic compliant material and a second layer contacting the liner having more rigid and wear resistant physical properties. In other embodiments, the compliant layer may be composed of three or more layers of elastomeric materials each having a different density contacting one another to produce a compliant layer having particular physical properties.

The material layers described above can be combined in any manner. For example, in some embodiments, each material layer may include a sheet or film of the material that are associated with one another by melting or welding each layer to an adjoining layer or by providing a bonding or adhesive layer that joins the adjacent layers. In other embodiments, the strips or filaments of the materials used in each material layer may be combined in woven or non-woven fabrics or felts.

Each of the one or more materials making up the compliant layer may be any material known in the art including, for example, thermoplastic or elastomeric polymers, steel springs, composite materials, metals, woven and non-woven materials such as fabrics, plastic wool, steel wools, and the like, fiber reinforced materials such as carbon fiber reinforced polymers or metal composites, and the like and combinations thereof. In various embodiments, the compliant layer may be composed of a material having, for example, high shear strength, low resistance to compression, high compressive strength, resistance to heat and/or cold, chemical resistance, and the like and combinations thereof.

High shear strength defines the maximum force that tends to produce material failure along a plane that is parallel in direction to the direction of the force. In some embodiments, the compliant layer may be composed of a material having a shear strength of greater than about 1000 pound force per square inch (psi), for example, about 1000 psi to about 70,000 psi, about 1200 psi to about 60,000, about 1500 psi to about 50,000 psi, about 2000 psi to about 40,000 psi, or any range or individual value encompassed by these example ranges.

Resistance to compression is generally a measure to how resistant a compound or composition is to deformation when force is applied. The compliant layer may generally exhibit low resistance to compression, for example, less than about 20 psi/0.001 inches (in) or less than about 20,000 psi/in. In some embodiments, the compliant layer may exhibit a resistance to compression of about 100 psi/in to about 20,000 psi/in, about 150 psi/in to about 15,000 psi/in, about 200 psi/in to about 10,000 psi/in, or any range or individual value encompassed by these example ranges.

In certain embodiments, such materials may have a compression set of greater than 5%, about 5% to about 50%, about 8% to about 40%, about 10% to about 30%, or any range or individual value encompassed by these example ranges. Compression set is a measure of permanent deformation that occurs when a force is applied to a material and then removed and refers to the percentage of original specimen thickness after the specimen has been left in normal conditions for a period of time, typically 30 minutes. The response time of the materials used in the compliant layer, i.e., the time necessary for the compressed specimen to fully deform may be less than 0.1 seconds, for example, about 0.001 seconds to 0.1 seconds, about 0.005 to about 0.05, or any range or individual value encompassed by these example ranges.

Compressive strength is a measure of the maximum uniaxial compressive force that can be applied to a material before the material fails. The compliant layer may generally exhibit high compressive strength of, for example, greater than 500 psi, and in various embodiments, the compressive strength exhibited by the compliant layer may be about 500 psi to about 35,000 psi, about 1000 psi to about 20,000 psi, about 1500 psi to about 10,000 psi, about 1500 psi to about 5000 psi, or any range or individual value encompassed by these example ranges.

Resistance to heat and cold refers to the ability of a material to maintain its structural integrity and physical properties such as shear strength, resistance to compression, and compressive strength when exposed to high or low temperatures. The compliant layer of various embodiments may exhibit resistance to heat, cold, or both heat and cold. For example, the compliant layer may be composed of a material resistant to heat and cold at temperatures of about −60° C. to about 400° C., about −40° C. to about 350° C., about −30° C. to about 300° C., about −20° C. to about 250° C., or any range or individual value encompassed by these example ranges.

Chemical resistance means that the material used in the compliant layer is inert or substantially inert to chemicals that it may contact. The compliant layer may be chemically resistant to a wide range of chemicals including, for example, water, various solvents such as alcohols and fluorinated and chlorinated hydrocarbons, and oils, grease, and other hydrophobic chemicals. In some embodiments, the compliant material may be non-porous.

Examples of materials that exhibit some combination of these physical properties include, but are not limited to, polyisoprene, cis-1,4-polyisoprene natural rubber (NR), trans-1,4-polyisoprene gutta-percha, synthetic polyisoprene (IR), polybutadiene (BR), chloroprene rubber (CR), polychloroprene, Neoprene, Baypren, butyl rubber, copolymers of isobutylene and isoprene (IIR), halogenated butyl rubbers, chloro butyl rubber (CIIR), bromo butyl rubber (BIIR), styrene-butadiene rubber (SBR), nitrile rubber, copolymer of butadiene and acrylonitrile (NBR), hydrogenated nitrile rubbers (HNBR), saturated rubbers, ethylene propylene rubber (EPM), ethylene propylene diene rubber (EPDM), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA), and various co-polymers and combinations thereof.

In some embodiments, the compliant layer may include one or more physical features that allow the material of the compliant layer to exhibit particular properties. For example, in some embodiments, two or more different materials may be bonded to one another to produce a compliant layer having a suitable combination of shear strength, resistance to compression, and compressive strength. In other embodiments, the compliant layer may include cavities which constrain the material so that further compression is restricted by the bulk modulus rather than the elasticity thereby increasing force that can be supported by the structure. In still other embodiments, the socket, ball, or shaft may include cavities positioned to allow the compliant material to change shape. For example, the socket 14 may include grooves or indentations that allow the compliant layer to compress more easily reducing the force needed for sufficient expansion as the bearing wears.

Figure 3:
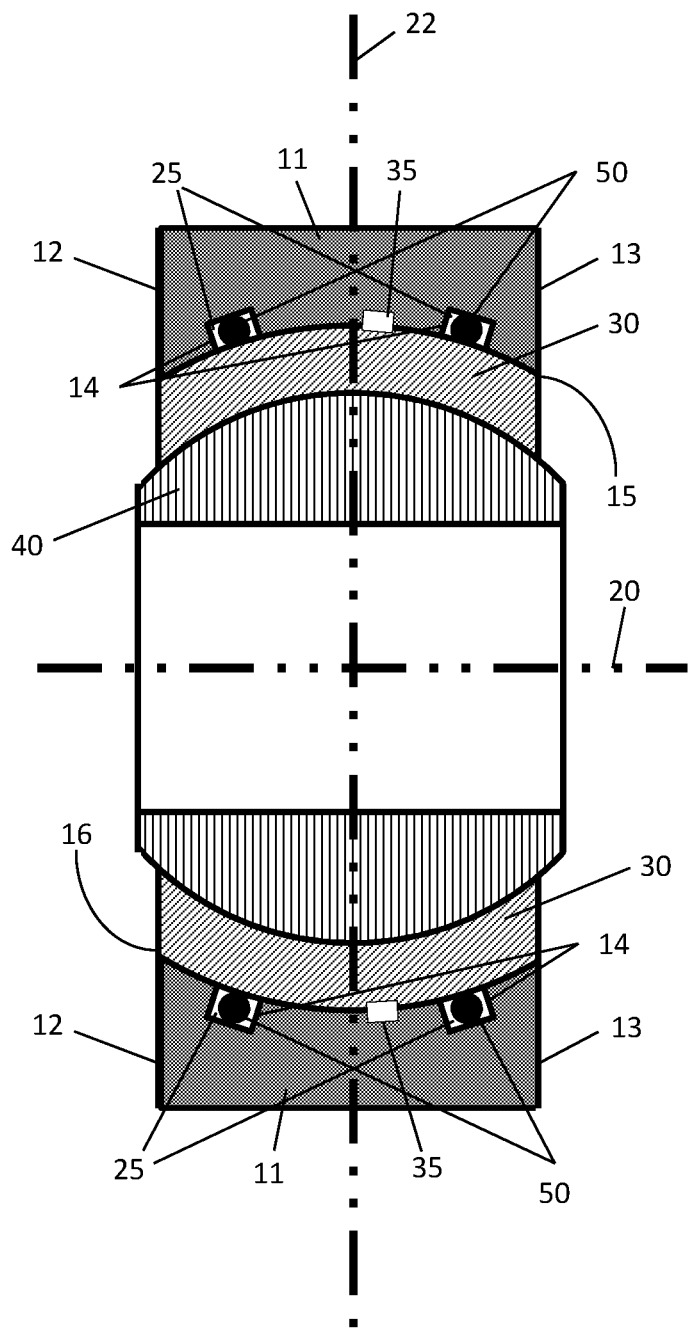
FIG. 3 is a drawing illustrating a second example of a bearing assembly including a compliant layer arranged as one or more o-rings.

In particular embodiments, the compliant layer 50 may consist of o-rings (for example, as pictured in FIG. 3) of compliant material that are fit into o-ring grooves 25 cut into the socket 14. In some embodiments, the grooves 25 may be positioned near an outer, exposed edge of the socket 14, the o-rings may be retained within the grooves 25. Such embodiments include any number of grooves 25 and o-rings 50. For example, in some embodiments, the bearing assembly may include one groove having one o-ring retained in the groove. In other embodiments, the bearing assembly may have two or more grooves 25 each having a retained o-ring 50, and in certain embodiments, two or more o-rings may be retained in a single groove. In some embodiments, the bearing assembly may include additional grooves that do not include retained o-rings. In particular embodiments, the o-rings may contact the bearing directly. In other embodiments, the liner may be disposed over the o-rings creating a bump or bulge in the surface created by the lining, and the bearing may contact the liner at the bump or bulge. In some embodiments, the bearing assembly may include a groove or other relief geometry (e.g., relief groove 35 as shown in FIG. 3) positioned to allow air flow between the liner and the bearing. In embodiments in which a bump or bulge creates the primary contact between the bearing and the liner, a vacuum can form behind the o-rings the groove or other may allow air to flow around the circumference of the bushing to prevent the vacuum from forming and pulling in contamination.

In some embodiments, the socket 14 may include extended bordering edges that prevent the compliant layer from expanding beyond a particular range so that further compression is restricted by the bulk modulus rather than the elasticity. Such bordering edges may be provided along the outer edge or the socket or at various positions within the socket. For example, bordering edges within the socket may segment the socket into two or more different sections that can receive the same or different compliant layers. The bordering edges can be formed in any way. For example, in some embodiments, the bordering edges may be machined into the socket, ball, or shaft. In other embodiments, the bordering edges may be formed from separate material from the liner or compliant layer such as, for example, a stiff rubber, plastic, or metal, and in still other embodiments, the bordering edges may include both machined bordering edges and edges formed from a separate material. For example, a machined border may hold a stiff rubber ring that holds the compliant layer in place.

A liner may be provided over the compliant layers and bordering edges in the completed bearing. In other embodiments, the compliant layer may be shaped to guide deformation and prevent extrusion. For example, the compliant layer may have tapered edges. Such shaped compliant layers may be used alone or in combination with other physical features such as bordering edges. In further embodiments, the liner may be used to contain deformation of the elastomer. For example, the liner may be bonded to the outer race around the compliant layer such that outer edges of the liner hold the compliant layer in place, or in other embodiments, the liner may fully encapsulate the compliant layer.

In still other embodiments, the socket 14 may include vertical ribbing along an axis or diagonally over a surface of the socket 14, and in some embodiments, the socket 14 may include two or more rectangular, triangular, or diamond shaped cutouts along a perimeter of the socket 14 that hold the compliant layer. In yet other embodiments, the socket 14 may include two or more of these physical features in combination. While the examples above refer to the socket, in some embodiments the physical features described above may be provided on the ball or shaft received by the socket rather than the socket.

The compliant layer may have various configurations. For example, in some embodiments, the compliant layer may be a continuous layer of material that is bonded to socket of the housing, ball, or shaft. In other embodiments, one or more portions of the socket of the housing, ball, or shaft may be coated in the compliant material. For example, the compliant layer may be composed of one or more pads attached to the socket, ball, or shaft, and in some embodiments, a grid of such pads may be attached to the socket, ball, or shaft. In certain embodiments, the pads may be laid out along the circumference of the socket, ball, or shaft. In some embodiments, the compliant material may be composed of rings or bands of the compliant material attached to the socket, ball, or shaft that substantially or fully cover the circumference of the socket, ball, or shaft.

In each of the embodiments described above, the compliant layer may be attached to the socket, ball, or shaft by being physically bonded to the bearing using, for example, a bonding agent or adhesive. In other embodiments, the compliant layer may be attached to the socket, ball, or shaft by the force of the ball or shaft against the socket. Such embodiments, therefore, do not require the use of a bonding agent or adhesive. In other embodiments, the liner may facilitate attachment of the compliant layer to the socket, ball, or shaft. For example, the liner may be bonded to the outer race around the compliant layer to hold the compliant layer in place, or the liner may fully encapsulate the compliant layer such that the liner is bonded to the socket, ball, or shaft and not the compliant layer. In certain embodiment, the liner may hold the compliant layer in place. For example, the compliant layer may not be physically attached the mounting surface, and may be held in place by the liner, which overlies the compliant layer and is physically attached to the mounting surface at the outer edge of the compliant layer or at holes in the compliant layer. In particular embodiments, the compliant layer may be o-rings and the liner may hold the o-rings in place by attaching to the mounting surface one either side of the o-rings. Such embodiments can be incorporated into bearings having grooves for retaining the o-rings or embodiments in which the o-rings are not retained in grooves.

The thickness of the compliant layer may vary among embodiments. In particular embodiments, the thickness of the compliant layer may be substantially the same along every concave surface of the mounting surface 14. In other embodiments, the thickness of the compliant layer may vary. For example, in some embodiments, the compliant layer 50 may be thicker near the circumferential openings 15, 16 of the body 11, and thinner near the traverse axis 22 of the body 11, and in other embodiments, two or more thickened portions of the compliant layer 50 may be axially dispersed over the surface of the mounting socket 14. In still other embodiments, the density of the compliant layer 50 may vary axially over the surface of the mounting socket 14. For example, higher density elastomeric materials may be provided near the circumferential openings 15, 16 of the body 11. In other embodiments, higher density materials may be disposed circumferential over the axial surface of the mounting socket 14.

In certain embodiments, the bearings, such as those described in FIG. 1, may further include a spring or other mechanical means for forcing the liner 30 to contact the bearing 40, and bearings including such mechanical means may or may not include a compliant layer. Such embodiments are not limited to any particular mechanical means. For example, in some embodiments, the mechanical means may be a series of springs dispersed within one or more circumferential channels disposes in the surface of the mounting socket 14. The springs may be conventional coiled springs, flat springs, leaf springs, and the like and combinations thereof. The mechanical means may contact a metal or high density polymer spacer that contacts the liner producing substantially equal force over the contact surface of the liner with the bearing. Such spacers can be continuous or segmented and, in some embodiments, may include elastic segments that allow for the spacer to expand and contract within the mounting socket. In other embodiments, the spacer may have an elastomer type backing.

The liners 30 of various embodiments may be composed of any material known in the art and useful for making bearing liners. Such materials include, but are not limited to, fabric liners that can be woven, braided, or knitted, tetrafluoroethylene (TFE) materials, polytetrafluoroethylene (PTFE, e.g., Teflon), polyethereketone (PEEK), and the like and combinations thereof. The liner 30 may be bonded to the compliant layer may be bonded to the compliant layer 50 by any means including, for example, adhesives, or other chemical bonding means.

The bearings 40 mounted within the mounting socket 14 are, generally, free to move and rotate within the socket. The bearing 40 may be machined from any suitable material, such as, for example, steel or aluminum alloys, composite materials, or fiberglass. In particular embodiments, the bearing 40 may exhibit resistance to wear and corrosion. In some embodiments, the bearing 40 may have a central cylindrical bore for receiving a shaft or other connector to the device on which the bearing assembly is mounted. In certain embodiments, the bearing 40 may have flat circular end faces, and the spherical surface between end faces may form the bearing surface of the bearing that contacts the liner. The spherical bearing surface may be ground to the required final dimension before fabrication of the bearing assembly 1, 2, and in certain embodiments, the bearing surface may be anodized or electroplated to achieve a desired level of surface finish.

The body 11 of the bearing assemblies encompassed by the invention may be composed of any material, such as, for example, steel or aluminum alloys, composite materials, and the like and combinations thereof. In various embodiments, the housing may include additional components that facilitate connection with other components of a device or machine. For example, in various embodiments, the body 10 may include one or more flanges, bores, recesses, tabs, grooves, and the like. Such components may, generally, extend away from the mounting socket 14 and may not hinder connection of, for example, a shaft with the bearing 40 disposed within the mounting socket 14.

Other embodiments are directed to method for making the bearing assemblies described above. Such methods may generally include the steps of applying a compliant material onto a surface of a mounting socket of a housing and applying a liner over the compliant material. In some embodiments, the methods may further include the steps of curing or vulcanizing the compliant material after applying the compliant material onto a surface of the mounting socket of the housing. In other embodiments, the compliant material may be fully cured before being applied to the surface of the mounting socket and the step of applying may require simply inserting the compliant material into the mounting socket, and in such embodiments, the methods may include applying an adhesive to the mounting socket before inserting the compliant material. Applying the liner may be carried out by known means and applying the liner can include curing or vulcanizing the material or inserting cured material into the mounting socket over the compliant layer. Such embodiments may further include applying an adhesive or otherwise preparing the surface of the compliant layer to receive the liner.

In some embodiments, such methods may further include the step of milling, swaging, forming, machining, or casting the housing, and in particular embodiments, the mounting socket may be further machined to provide an appropriate surface for applying the compliant layer. These additional steps may serve to compress (pre-load) the compliant layer or the compliant layer may already be compressed. For example, in some embodiments, the mounting socket may be machined or polished to remove imperfections, and in other embodiments, the mounting socket may be roughed or grooved to increase the surface area for connecting to the compliant material. In still other embodiments, grooves or flanges may be machined into the mounting socket that hold the compliant material and, in some embodiments the compliant material a liner, in place during use.

In particular embodiments, the housing may be reused. For example, the housing may consist of an outer race that is sized to fit within the housing or an existing bearing assembly. Such an outer race may be substantially cylindrical and may include one or more means for connecting to an existing housing such as, for example, flanges, tabs, bores for screws or bolts and the like and combinations thereof. In certain embodiments, methods for reusing housings of existing bearing assemblies may include the steps of applying an adhesive to the housing or outer race before contacting the housing with the race, welding the race to the housing, and the like or combinations thereof

The invention claimed is:

1. A bearing assembly comprising:
    a housing, having a body axially spaced sides, and an axially extending bore forming a mounting surface, extending between the axial spaced sides;
    a bearing housed within the axially extending bore;
    a liner disposed on a circumferential surface of the mounting surface and positioned to contact the bearing; and a compliant layer having a compressive strength measured as a uniaxial compressive force of about 500 psi to about 35,000 psi disposed between the liner and the mounting surface.

2. The bearing assembly of claim 1, the liner comprises a low friction or self-lubricating material.

3. The bearing assembly of claim 1, wherein compliant layer comprises thermoplastic or elastomeric polymers, composite materials, metals, woven and non-woven materials, fabrics, plastic wool, steel wools, steel spring, and the like, fiber reinforced materials, carbon fiber reinforced polymers or metal composites, and combinations thereof.

4. The bearing assembly of claim 1, wherein the bearing comprises a spherical bearing, ball, or shaft.

5. The bearing assembly of claim 1, wherein the compliant layer is at least partially compressed.

6. The bearing assembly of claim 1, wherein the compliant layer has a shear strength of about 500 psi to about 30,000 psi.

7. The bearing assembly of claim 1, wherein the compliant layer has a response time necessary for the compliant layer when compressed to fully deform in about 0.001 seconds to 1 seconds.

8. The bearing assembly of claim 1, wherein the compliant layer comprises a material selected from the group consisting of polyisoprene, cis-1,4-polyisoprene natural rubber (NR), trans-1,4-polyisoprene gutta-percha, synthetic polyisoprene (IR), polybutadiene (BR), chloroprene rubber (CR), polychloroprene, Neoprene, Baypren, butyl rubber, copolymers of isobutylene and isoprene (IIR), halogenated butyl rubbers, chloro butyl rubber (CIIR), bromo butyl rubber (BIIR), styrene-butadiene rubber (SBR), nitrile rubber, copolymer of butadiene and acrylonitrile (NBR), hydrogenated nitrile rubbers (HNBR), saturated rubbers, ethylene propylene rubber (EPM), ethylene propylene diene rubber (EPDM), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA), and co-polymers and combinations thereof.

9. The bearing assembly of claim 1, wherein the compliant layer comprises two or more different materials bonded together.

10. The bearing assembly of claim 1, wherein the compliant layer is bonded to a socket.

11. The bearing assembly of claim 1, wherein the compliant layer is attached to the liner by adhesives or chemical bonding.

12. The bearing assembly of claim 1, further comprising bordering edges along an outer edge of the axially extending bore.

13. A bearing assembly comprising:
a housing, having a body axially spaced sides, and an axially extending bore forming a mounting surface, extending between the axial spaced sides;
a bearing housed within the axially extending bore;
a compliant layer comprising one or more o-rings contacting the mounting surface; and
a liner disposed on the mounting surface and positioned to contact the bearing wherein the liner is attached to the mounting surface on either side of at least one of the o-ring.

14. The bearing assembly of claim 13, further comprising grooves in the axially extending bore sized to retain at least one of the one or more o-rings.

15. The bearing assembly of claim 13, wherein at least one of the one or more o-rings is positioned near an outer edge of the axially extending bore.

16. The bearing assembly of claim 13, further comprising a relief groove or hole in the bearing positioned to allow air flow between the liner and the bearing.

17. The bearing assembly of claim 13, further comprising bordering edges along an outer edge of the axially extending bore.

* * * * *